United States Patent Office 2,838,142
Patented June 10, 1958

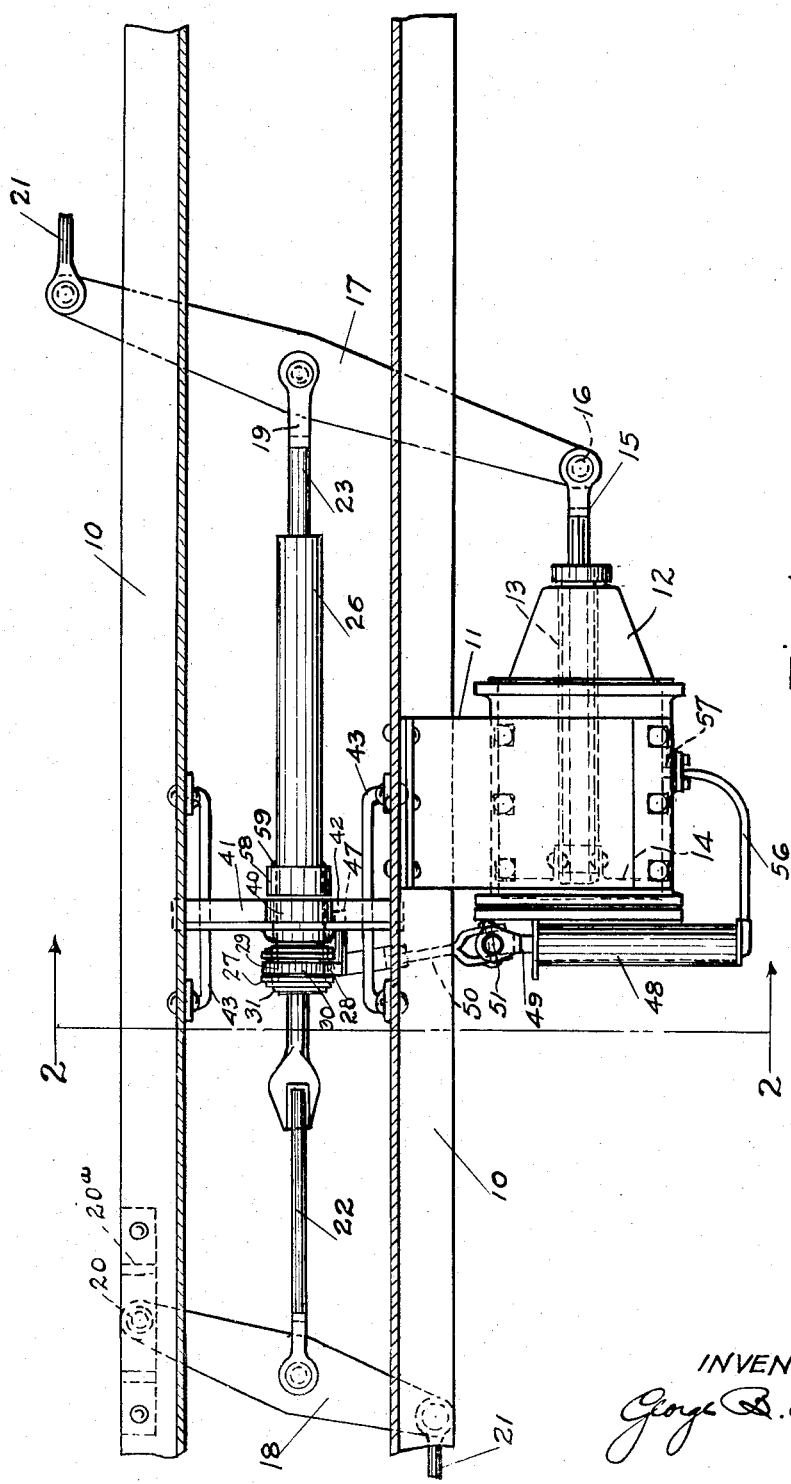

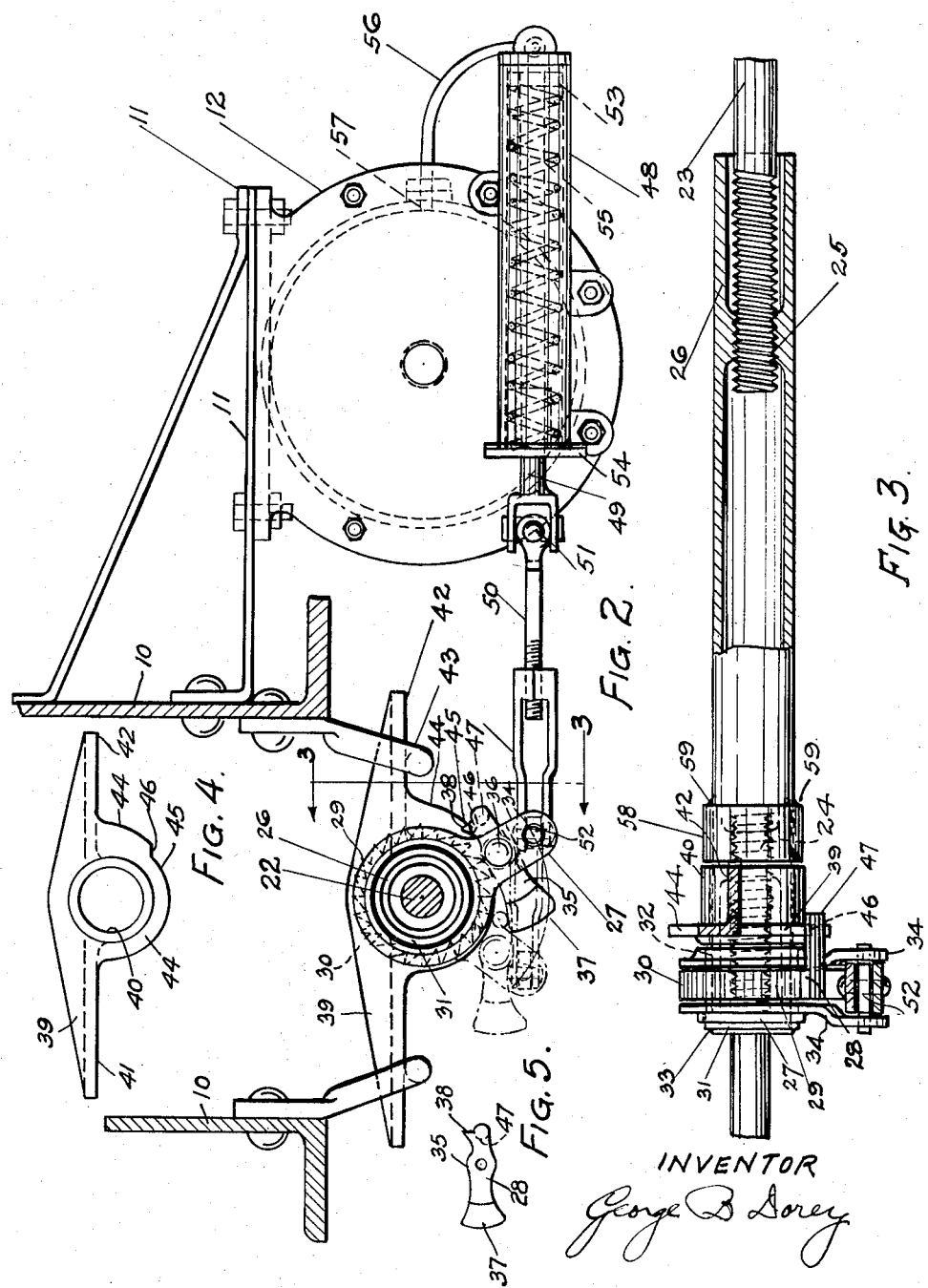

2,838,142

BRAKE SLACK ADJUSTER

George B. Dorey, Westmount, Quebec, Canada

Application January 24, 1955, Serial No. 483,764

2 Claims. (Cl. 188—198)

The invention relates to an improved brake slack adjuster such as employed in railway cars and the like for maintaining piston travel within a certain predetermined limit.

The objects of the invention among others are: to provide a slack adjuster wherein a longitudinally and laterally movable rod having a rotatable take-up device interposed therein is supported intermediate its ends from the car structure; and to provide improved declutching means for releasing an operating pawl at a predetermined extent of angular movement of a rockable lever employed for rotating a slack adjuster take-up device.

The invention further resides in the co-operation between a carrier for a take-up device and lever and pawl mechanism whereby release of the pawl is effected by co-operating engagement between the pawl and carrier.

For further comprehension of the invention reference may be had to the accompanying drawings wherein the improvement is shown as applied to a railway car and wherein:

Figure 1 is a plan view of a portion of the underframe of a railway car showing only as much of the car as necessary to show the improvement applied thereto.

Figure 2 is a vertical sectional view on an enlarged scale as taken on a line 2—2 of Fig. 1.

Figure 3 is a longitudinal vertical view of the take-up device as taken on a line 3—3 of Fig. 2 and partly broken away to better illustrate the interior of the take-up device.

Fig. 4 is a detached frontal elevational view of the carrier as seen in Fig. 2.

Fig. 5 is a detached elevational frontal view of the pawl as seen in Fig. 2.

In said drawings 10—10 indicates the center sills, 11 a bracket secured to the center sill, and 12 a brake operating cylinder carried by the bracket. The cylinder 12 is fitted with a hollow push rod 13 forming part of a piston assembly 14 whereby the brake is operated upon admission of compressed air in the cylinder.

A push rod 15 which extends within the hollow rod 13 is pivotally connected at 16 to a brake lever 17 and the latter is connected with another lever 18 by means of a center connection rod 19. The lever 18 is pivotally mounted at 20 on a bracket 20a which in turn is rigidly secured to the underframe. The said levers 17 and 18 connect with top rods 21 which in turn connect with the brake parts of the respective trucks (not shown).

The center connection rod 19 is divided lengthwise into two sections as indicated at 22 and 23 respectively and the adjacent ends of the respective sections are screw-threaded to present right and left screwthreaded sections as indicated at 24 and 25 respectively.

The respective screwthreaded ends are united by a complementary interiorly screwthreaded take-up device 26 which upon rotation operates to vary the length of the connection and thereby effect adjustment for variations in the brake parts due to stretching of rods and wear in pins and brake shoes.

Rotation of the take-up device 26 is preferably effected by a ratcheting action through the medium of a lever 27 rockably mounted on the take-up device and arranged to have clutch connection therewith through the medium of a pawl 28 having engagement with the teeth 29 of a ratchet wheel 30.

The ratchet wheel 30 is formed with side hub sections indicated at 31 and 32 which are preferably welded to the take-up device as at 33. The lever 27 consists of a pair of walls 34—34 lying on the respective sides of the ratchet wheel 30 being rotatably mounted on the hub sections 31 and 32. The pawl 28 includes a body portion 35 disposed between the walls 34—34 and pivotally united therewith at 36. The pawl is counterweighted at 37 to normally bias the detent portion 38 into engagement with the ratchet teeth 29.

Immediately adjacent the hub section 32 there is disposed a carrier member 39 having a central bearing portion 40 encircling the take-up device and laterally extending wings 41 and 42 which extend from the respective sides of the bearing 40 and are underlaid by longitudinally extending supporting guides 43.

A vertically disposed web 44 extends downwardly below the wings and lies adjacent the hub section 32 and has an edge surface 45 extending on an irregular contour to present an enlarged camlike portion 46 with which a lateral extension 47 on the pawl is adapted to engage and disengage the detent portion 38 of the pawl from the ratchet wheel as indicated by full lines in Fig. 2.

The weighted portion 37 of the pawl normally biases the detent into engagement with the teeth of the ratchet wheel as indicated by conventional dot and dash lines in Fig. 2 and the contour of surface 45 is such that this biased position of the pawl is maintained throughout the major portion of the swing of the lever and the displacement movement of the pawl is only initiated as the lever approaches the completion of the take-up movement.

Although any desired means may be employed for swinging the lever and operating the slack adjuster, a preferred method of air operation is shown. The operator shown includes a cross cylinder 48 having a push rod 49 connected with the lever 27 by means of an adjustable link 50 having universal connections 51 and 52 at the respective ends thereof.

The push rod 49 is fitted with a piston 53 and intermediate said piston and the non-pressure head 54 of the cylinder a spring 55 is interposed. A pipe 56 connects the main cylinder with the auxiliary cylinder for moving the piston 53 forwardly, upon movement of the main piston 14 to a predetermined extent. The main cylinder 12 is provided with the usual exhaust port 57 with which the pipe 56 makes connection. The operation of the slack adjuster, upon excessive travel of the push rod and the parts of the brake in released position, is as follows: Upon forward movement of the push rod during the brake applying operation and consequent upon excessive travel of the push rod, the main piston 14 travels beyond the port 57 and compressed air then enters the auxiliary cylinder forcing the piston 53 and push rod 49 forwardly and energizing the spring 55. The position of the parts will then be as shown by conventional dot and dash lines in Fig. 2 with the detent 38 of the pawl 28 in engagement with the ratchet wheel. Upon release of the air in the main cylinder the energy of spring 55 returns the piston 53 to released position and rocks the lever 27 in a direction to take up slack. As the rocking of the lever approaches the end of its movement in a take-up direction the lateral extension 47 of the pawl rides on the cam surface 46 of the carrier and is thereby displaced outwardly releasing the detent from its engagement with the teeth of the ratchet wheel.

The carrier 39 is maintained in definite axial relation to the take-up device by being interposed between the hub 32 of the ratchet wheel 30 and a sleeve 58, the latter being fixedly mounted on the take-up device by welding as at 59. Inasmuch as the carrier moves with the take-up device both laterally and longitudinally, it will be appreciated that release of the pawl will be effected at a given angular relation between the lever and carrier irrespective of the position of the center connection.

What is claimed as new is:

1. In a slack adjuster for the brake leverage system of a railway car including a brake lever and a rod pivoted at one end to the lever, said rod having a take-up device operable by rotation for varying the length of the connection and thereby compensate for slack in the system; means for rotating the take-up device including a ratchet wheel fixedly mounted on the rotatable device and a lever rockably mounted on the take-up device adjacent the ratchet wheel; and a pawl carried by the lever to provide a clutch connection with the ratchet wheel when the lever is rocked in one direction and rocked independently thereof in the opposite direction, said pawl being biased to normally engage with the ratchet wheel; the herein described improvement including a carrier for supporting the take-up device at a location remote from the brake lever and positioned adjacent the ratchet wheel, said carrier including a central section rotatably supporting the take-up device and laterally extending wings at each side of the central section, said carrier being maintained against longitudinal displacement in one direction by the ratchet wheel and a stop collar fixedly mounted on the take up device for preventing displacement in the opposite direction; supports underlying the wings; a finger on the pawl extending in a plane parallel with the plane of the carrier and a cam face on the carrier adapted to engage with the finger of the pawl and displace the latter from its biased position to release the said pawl from the ratchet wheel at a predetermined extent of angular movement of the operating lever.

2. In a slack adjuster for the brake system of a railway car including brake levers having an interconnecting rod pivotally uniting said levers and a take-up device operable by rotation interposed in the rod for varying the length thereof to compensate for slack in the brake parts, said take-up device having a lever rockably mounted thereon, a toothed ratchet wheel fixedly mounted on the lever and having a detent engaging the teeth of the ratchet wheel to rotate the take-up device by rocking movement of the lever, said pawl being biased into engaging relation with the teeth of the ratchet wheel; the herein described improvement for supporting the take-up device and displacing the pawl to an inoperative position including a carrier having a central bearing portion rotatably supporting the take-up device and held against axial displacement relatively to the take up device; and supporting guideways underlying the carrier, said carrier being located adjacent the pawl and a finger on the latter extending sideways from said pawl to lie in a plane parallel with the carrier; and a cam like wall on the carrier presenting an irregular contour to engage the finger on the pawl and swing the detent of the latter outwardly from the ratchet teeth at a predetermined extent of angular movement of the lever.

References Cited in the file of this patent
UNITED STATES PATENTS

| | | |
|---|---|---|
| 749,967 | Keville | Jan. 19, 1904 |
| 1,281,535 | Down | Oct. 15, 1918 |
| 1,961,919 | Anderson | June 5, 1934 |
| 2,021,804 | Ostrander | Nov. 19, 1935 |